United States Patent Office.

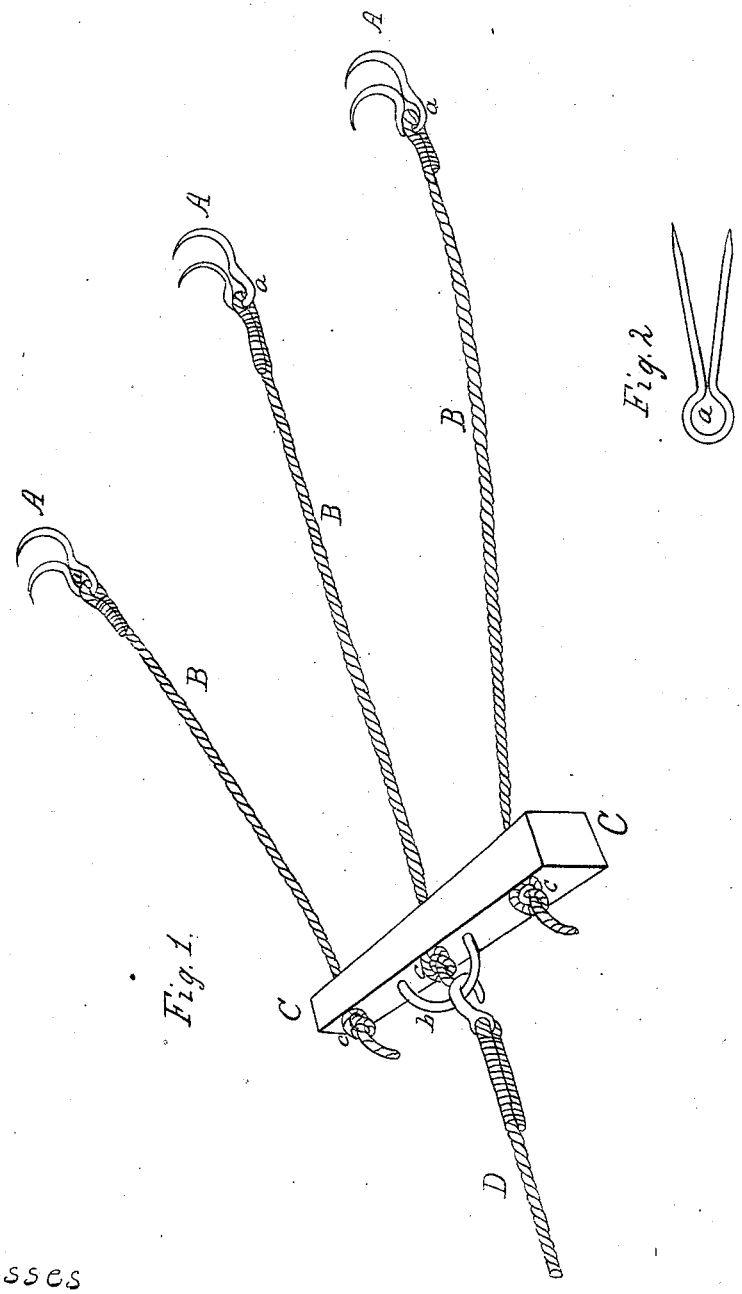

JULIUS WOOD, OF SMYRNA, NEW YORK.

Letters Patent No. 64,729, dated May 14, 1867.

---

IMPROVEMENT IN HAY-UNLOADERS.

---

*The Schedule referred to in these Letters Patent and making part of the same.*

---

TO WHOM IT MAY CONCERN:

Be it known that I, JULIUS WOOD, of Smyrna, in the county of Chenango, State of New York, have invented a new and improved machine for unloading hay or straw, to be called a "Hay-Unloader;" and I do hereby declare that the following is a full and exact description of the construction and operation of the same; reference being had to the annexed drawings.

A A A are hooks made of round iron or steel rods. According to the experiments which I have made, the hooks should be made of five-eighths inch iron, or about that size. To make a pair of hooks, take a rod of the required diameter and about three feet long, and sharpen both ends. Then double them in such a way as to make an eye, as shown at $a$, Figure 2. Then the ends are bent into a hook, very much in shape like a fish-hook; but the points should be five or six inches or more apart. All that is necessary in regard to the shape is that they should be of such form as to hold on to the hay while drawing directly upon the eye. B B B are ropes, which are attached to the hooks A A A at the eyes $a\ a\ a$ in any convenient manner, and the other ends are attached to the head C C. The ropes should be from eight to fifteen feet long, for reasons which will hereafter appear. The head C C may be of any convenient length, say three or four feet long. The head may be wholly dispensed with by substituting for it a large iron ring, into which the ropes may be fastened; but from experiment I am satisfied that the ropes may be more easily kept from tangling by the use of a head-piece three or four feet long than by the use of the ring, and hence is preferable; but I claim any device, whether ring or bar, which answers the purpose of a head-piece. The ropes are passed through holes in the head-piece, and knots tied in their ends, or otherwise fastened to the head-piece. In this way the lengths of the ropes are easily adjusted. Three ropes are all that are necessary for one machine, and in some cases two would answer. An eye, $b$, is fastened to the head C C, to which the rope D is fastened in any convenient manner.

The Manner of Using.

It must be observed that whatever improvements may hereafter be made upon the machine, it is not intended, in its present form, to lift hay or straw, but to roll it off. It is therefore to be used for unloading hay into a bay or low mow or on to the bottom of a stack. For these purposes I claim great advantages over any heretofore known device. To use it, remove the rope D, and place the machine upon the rack before the load is placed on. The outside hooks should be placed near the ends of the rack and the other midway between. Then put the load on, covering the ropes and hooks, and drive to the place where it is to be unloaded. The load may now be rolled off, simply, or it may be rolled off and back some distance. If it be desired to simply roll it off, the hooks must be fastened into the hay just above the rack. Then the rope D is fastened to the head C C, and passed over pulleys conveniently placed in the barn, and one or more horses attached to it, when they will easily roll it off. If we wish to roll it off for the foundation of a stack, the rope D is passed over the top of the load, and the horses attached to the end of it, as before. If we desire to roll it on to the back side of a mow or stack, we must pull on the ropes B B, so as to secure several feet between the hooks and the edge of the rack. To do this it may be necessary to let out the ropes at $c\ c\ c$. It may be observed that any length of ropes B B B may be used, provided there is room enough in the barn to use the machine without drawing the head-piece against the pulleys. When the hooks are drawn through, as just described, they are drawn over the top of the load and fastened in the hay, as before. The distance which the hay is rolled depends upon the distance which the hooks are passed over the load. The hooks will in all cases free themselves as soon as the hay is all rolled off from them. Before the rolling is commenced a piece of board or scantling, or other support, should be placed under the side of the rack over which the load is to be rolled, to prevent the tipping of the rack.

By means of this machine a load may easily be rolled on to a stack or mow which is not higher than half the height of the load.

What I claim as my invention, and desire to secure by Letters Patent, is—

The combination of the hooks, ropes, and head-piece, or their mechanical equivalents, as and for the purposes herein set forth.

JULIUS WOOD.

Witnesses:
F. E. DIMMICK,
W. A. BROOKS.